United States Patent [19]

Townsend et al.

[11] Patent Number: 5,266,421

[45] Date of Patent: Nov. 30, 1993

[54] ENHANCED MEMBRANE-ELECTRODE INTERFACE

[75] Inventors: Carl W. Townsend; Arthur B. Naselow, both of Los Angeles; Andrew Kindler, San Marino, all of Calif.

[73] Assignee: Hughes Aircraft Company, Los Angeles, Calif.

[21] Appl. No.: 881,932

[22] Filed: May 12, 1992

[51] Int. Cl.⁵ .............................................. H01M 8/12
[52] U.S. Cl. .................................... 429/192; 429/33; 429/41
[58] Field of Search ........................... 429/192, 41, 33

[56] References Cited

U.S. PATENT DOCUMENTS

| | | | |
|---|---|---|---|
| 4,556,614 | 12/1985 | le Méhauté et al. | 429/191 |
| 4,592,973 | 6/1986 | Pemsler et al. | 429/206 |
| 4,738,904 | 4/1988 | Ludwig et al. | 429/17 |
| 4,822,701 | 4/1989 | Ballard et al. | 429/192 |
| 4,865,930 | 9/1989 | Kindler et al. | 429/192 |

*Primary Examiner*—Prince Willis, Jr.
*Assistant Examiner*—M. Nuzzolillo
*Attorney, Agent, or Firm*—M. E. Lachman; M. W. Sales; W. K. Denson-Low

[57] ABSTRACT

A membrane-electrode assembly for use in thermoelectrochemical systems. The electrode assembly includes a radiation grafted cation exchange membrane which is plasma etched to provide an etched anode surface and etched cathode surface. A catalytic cathode layer is thermally bonded to the etched cathode surface and a catalytic anode layer is thermally bonded to the etched anode membrane surface. The resulting membrane-electrode assembly is resistant to delamination and provides electrochemical performance which is equal to or better than that obtained with more expensive conventional electrodialysis membranes.

14 Claims, No Drawings

ENHANCED MEMBRANE-ELECTRODE INTERFACE

BACKGROUND OF THE INVENTION

1. Field of the Invention

The present invention relates generally to electrochemical cells. More specifically, the present invention relates to enhanced membrane-electrode assemblies for use in such electrochemical systems and processes for making the enhanced membrane-electrode assemblies.

2. Description of the Related Art

U.S. Pat. No. 4,738,904, issued Apr. 19, 1988, and assigned to the present assignee, discloses a thermoelectrochemical system in which a continuous electrical current is generated from heat input below 250° C. In this system, a hydrogen ion reacting cathode is immersed in a chosen Bronsted acid and a hydrogen ion reacting anode is immersed in a chosen Bronsted base. Reactants consumed at the electrodes during the electrochemical reactions are directly regenerated thermally below about 250° C., and recycled to the electrodes to provide continuous operation of the system. The electrodes used in this type of thermoelectrochemical system are typically composed of platinum or other catalytic particles which are held together by a support network of microscopic hydrophobic fibers made from materials such as polytetrafluoroethylene (PTFE).

In operation of the above thermoelectrochemical system, hydrogen gas reacts with ammonia or an amine vapor in microscopic pores in the anode electrode to generate an electron and an ammonium ion or a protonated amine. The protonated amine ion is transported through a membrane in the cell to the cathode, where the protonated amine is transported into the microscopic pores of the cathode which are present between the platinum particles. Within these microscopic pores, a liquid acid and an electron react to produce hydrogen gas and an acid anion. The anion combines with the protonated amine ion to form a liquid salt.

The above-described thermoelectrochemical systems typically utilize "zero-gap" cells in which a thin electrocatalytic anode layer is bonded to one side of a thin membrane layer and a thin electrocatalytic cathode layer is bonded to the other side of the membrane. Nafion ® is a cationic exchange membrane material available from E. I. DuPont de Nemours which is used as a common membrane material. Processes for bonding catalytic cathodes and anodes to Nafion ® membranes are well-known in the art and typically involve thermal bonding.

Zero-gap cells which include Nafion ®-type membranes are well-suited for their intended purpose. However, the cost of Nafion ® membranes is relatively high and therefore precludes use of the these membranes for many commercial applications. Accordingly, it would be desirable to provide a zero-gap membrane-electrode assembly which is made using low-cost membrane material and provides electrochemical performance which is equal or superior to that obtained by cells utilizing Nafion ® membranes.

SUMMARY OF THE INVENTION

In accordance with the present invention, it was discovered that relatively inexpensive radiation-grafted cationic exchange membranes may be substituted in place of Nafion ® membranes in membrane-electrode assemblies. The present invention is based upon the discovery that such radiation grafted cationic exchange membranes may be securely bonded to catalytic anodes and cathodes provided that the surfaces of the radiation grafted membrane are plasma-etched prior to bonding with the electrode layers. Further, it was discovered that the resulting membrane-electrode assemblies provided electrochemical performance which is equal to or better than that obtained by equivalent cells utilizing Nafion ® membranes.

In accordance with the present invention, a membrane-electrode assembly is provided which is adapted for use in a thermoelectrochemical system. The membrane-electrode assembly includes a radiation grafted cationic exchange membrane having a plasma-etched anode surface and a plasma etched cathode surface. A catalytic cathode layer is bonded to the plasma-etched cathode surface of the membrane and a catalytic anode layer is bonded to the plasma-etched anode surface of the membrane. This membrane-electrode assembly is relatively inexpensive to make and is prepared in accordance with well-known fabrication techniques.

As a feature of the present invention, the radiation grafted cationic exchange membrane may be selected from the group of membranes consisting of radiation grafted fluorosulfonic acid membranes, radiation grafted benzenesulfonic acid membranes, radiation grafted acrylic acid membranes, and radiation grafted methacrylic acid membranes. It was discovered that benzenesulfonic acid membranes available from RAI Research Corp. and identified as R1010 or R1020 are especially well-suited for use in accordance with the present invention since they are relatively inexpensive and provide electrochemical performance which is equal to or superior to that obtained with Nafion ® membranes.

In accordance with the present invention, a process is described for making the above described membrane-electrode assemblies. The process involves providing a radiation grafted cationic exchange membrane having an anode surface and a cathode surface. These two surfaces are plasma-etched utilizing an oxidizing plasma to form plasma-etched anode and cathode surfaces. The catalytic anode and cathode layers are then thermally compression bonded to their respective anode and cathode surfaces. This process is simple, efficient and inexpensive. The membrane-electrode assembly is resistant to delamination and is therefore well-suited for use over extended periods of time in thermoelectrochemical systems.

The above-discussed features and attendant advantages of the present invention will become better understood by reference to the following detailed description.

DETAILED DESCRIPTION OF THE INVENTION

The present invention is an improved membrane electrode assembly which is adapted for use in thermoelectrochemical system of the type disclosed in U.S. Pat. No. 4,738,904. The contents of this patent are hereby incorporated by reference. Although the membrane electrode assembly in accordance with the present invention is especially well-suited for use with thermoelectrochemical systems, the invention also may be used in a wide variety of electrochemical cells and systems where a zero-gap electrode assembly is required. Accordingly, it will be recognized by those skilled in the art that the membrane-electrode assembly of the present invention is not limited for use in thermoelectrochemical systems, but may be used in a wide variety of electrochemical cells.

The membrane-electrode assembly in accordance with the present invention includes a centrally located membrane layer which is made from radiation grafted cationic exchange material. The membrane materials which may be used include radiation grafted fluorosulfonic acid membranes, radiation grafted benzene-sulfonic acid membranes, radiation grafted acrylic acid membranes and radiation grafted methyacrylic acid membranes. The preferred membrane material is radiation grafted benzenesulfonic acid. Particularly preferred membranes are those available from RAI Research Corporation (Hauppauge, N.Y.). The membrane materials are identified as R1010 or R1020. The membranes have a thickness of 2 mils (0.005 cm) when hydrated and resistance in 0.6 normal potassium chloride of 0.2-0.5 Ohm-cm$^2$. The ion exchange capacity of the membranes are on the order of 1 milliequivalent per gram (meq/g) when the membranes are dry. When wet, the membranes are made up of 20% by weight water. The ion selectivity of the membranes is on the order of 86% (0.5N KCl/1.0N KCl). Although the type R1010 or R1020 membranes are preferred, other electrodialysis membranes having equivalent properties and characteristics may be utilized in accordance with the present invention. The membranes may have a thickness of from 1 to 10 mils (0.003 to 0.03 cm) with a thickness of about 2 mils (0.005 cm) being preferred.

An essential aspect of the present invention involves preparing the anode and cathode surfaces of the membrane for bonding to the catalytic electrode layers. In accordance with the present invention, the surfaces of the membrane which are to be bonded to the anode and cathode must be plasma etched in an oxidizing plasma. Etching by physical abrasion or chemical etching using conventional etchants such as sodium was found to be unsuitable. Oxygen is the preferred plasma for use in o etching the membrane surfaces. However, other oxidizing plasmas, such as ozone, chlorine oxide, or fluorine oxide may be utilized. The plasma etching is conducted utilizing conventional plasma etching equipment operated under conventional conditions. For example, suitable plasma etching may be obtained by exposing the membrane for 1.5 hours to an oxygen plasma at 100 millitorr (0.1 millimeters of mercury) with a plasma energy of 200 watts. The various plasma parameters may be varied widely provided that no more than 10 to 20 percent of the overall thickness of the membrane is etched away.

After the anode and cathode surfaces of the membrane are etched, the membrane is then bonded to the anode and cathode layers using conventional thermal bonding procedures. The particular pressure and temperature at which the electrode layers are bonded to the membrane can be chosen from within well-known parameters that are used in fabricating zero-gap cells utilizing a Nafion ® membrane sandwiched between anode and cathode layers. For example, temperatures of about 200° C. are typically used with pressures on the order of 2,000 psi (140.7 kg/cm) being applied to the layered stack of electrodes and membranes.

Optionally, prior to bonding, the anode and/or cathode may be impregnated with liquid Nafion ® solution to enhance the surface area of the membrane, which helps minimize resistance to ion movement through the membrane.

The catalytic electrodes which are bonded to the plasma etched membrane layer may be any of the well-known catalytic electrodes which are in the form of thin layers. Such catalytic electrodes typically include catalytic particles which are anchored as clusters within a polymer network. Typically, the catalytic electrode particles will have diameters ranging from about 25 to about 100 angstroms. Suitable catalytic particles include platinum, palladium, nickel boride, tungsten carbide, silver, platinized carbon black, platinized graphite, and any other of the known materials which are used as electrode particles. Platinum and platinized carbon black are preferred electrode materials. These materials are available commercially in particle form and are conventionally identified as fuel cell grade particles.

The support network in which the catalytic particles are bound is preferably a hydrophobic material such as polytetrafluoroethylene (PTFE) or paraffin. Other support network materials may be used provided that they have similar hydrophobic properties and are capable of anchoring the catalytic particles in a manner similar to PTFE or paraffin. PTFE is the preferred support network material for catalytic electrodes. The PTFE is preferably in the form of an aqueous dispersion of angstrom-sized particles. Such aqueous dispersions of Teflon ® are available from E. I. Du Pont de Nemours, with the preferred aqueous dispersion being identified as Teflon ® 30 aqueous dispersion. Such aqueous dispersions of Teflon ® are commonly used in combination with fuel cell grade platinum particles and other catalytic particles to form a dispersion, which upon conventional sintering procedures provides a catalytic electrode layer which may be used as either an anode or cathode. The anode and cathode layers, in accordance with conventional cell requirements, will have thicknesses on the order of 0.5 to 5 mils (0.0013 to 0.013 cm).

Examples of practice of the present invention are presented below.

EXAMPLE 1

A preferred membrane electrode assembly in accordance with the present invention was produced as follows using RAI R1010 as the membrane material and platinum as the catalytic particles for the cathode and anode:

1. 7.1 mg platinum black Englehard (50-100 angstroms particle size), and 10 mg of zinc (1-5 micron particle size) were intimately mixed. The platinum black was obtained from Englehard (Seneca, S.C.) and the zinc dust was obtained from Mallinkrodkt (Saint Louis, Mo.).
2. A quantity of Teflon 20 Aqueous Dispersion (from DuPont) was diluted to 10% by volume with water. Two drops of this solution (4.5 mg Teflon) were added to the above mixture and slurried together.
3. The slurry was spread out over a circle of aluminum foil which was 1.55 cm in diameter (1.88 cm$^2$) and dried in an oven at 110° C. for 2 minutes.
4. The dried mixture was sintered in nitrogen at 350° C. for 10 minutes.

Both the anode and cathode were prepared according to the above procedure. The anode was treated with liquid Nafion ® solution (Solution Technology, Inc., of Mendenhall, Pa.) to enhance the surface area of the catalytic particles which contact the membrane. The treatment with Nafion ® was followed by bonding of the anode and cathode to the membrane as follows.

1. A quantity of 5% by weight of Nafion ® solution was diluted to 1% with isopropanol and mixed well.
2. Under a nitrogen atmosphere, 2 drops of this solution were added to the anode and spread evenly over the surface.
3. The solution was dried at 70° C. under nitrogen to cure the Nafion ®.
4. A type R1010 membrane obtained from RAI Research Corporation was provided. The membrane was 2 mils thick and was in the shape of a 3 inch by 3 inch square (7.6×7.6 cm). Prior to bonding of the electrodes to the membrane, the membrane was plasma etched for 1.5 hours in oxygen at 100 millitorr (0.1 mm Hg) with a plasma energy of 200 watts.
5. The electrodes were then bonded to opposite sides of the membrane by stacking the membrane between the electrodes and inserting the stack into a hydraulic press. A thin rubber pad (about 3 cm in diameter) was placed on top of the stack to assure that pressure was evenly distributed over the entire electrode area. The stack was then pressed at 2000 psi (140.7 kg/cm$^2$) at 200° C. for 2 minutes. The assembly was then removed from the press and the aluminum foil was carefully peeled off. The zinc dust in the electrode was removed by leaching the assembly in 20 weight % hydrochloric acid.

EXAMPLE 2

A membrane-electrode assembly was produced as described in Example 1 except that the membrane was not plasma etched prior to its being sandwiched between and bonded to the anode and cathode layers.

EXAMPLE 3

A membrane-electrode assembly was produced as in Example 1 except that the membrane was not plasma etched and the temperature at which the electrodes were heat bonded to the membrane was 150° C. instead of 200° C.

EXAMPLE 4

A membrane-electrode assembly with a modified anode was produced as follows:
1. 7.1 mg platinum black (Englehard, 50–100 angstrom particle size) and 10 mg of zinc dust were intimately mixed.
2. 2 drops of 1% Nafion ® solution were added to the mixture and intimately mixed.
3. The slurry was spread out over a circle of aluminum foil which was 1.55 cm in diameter and dried in an oven at 110° C. for 2 minutes.
4. The membrane was not plasma etched and the electrodes were heat bonded to the membrane at a temperature of 150° C. and a pressure of 2000 psi (140.7 kg/cm,) for 2 minutes.

EXAMPLE 5

A membrane-electrode assembly was produced as in Example 1 except that the membrane was not plasma etched, the anode contained no Nafion ® and the electrodes were heat bonded to the membrane at a temperature of 150° C.

EXAMPLE 6

A membrane-electrode assembly was produced in accordance with the methods used at the Los Alamos National Laboratory as described in the publication entitled "Recent Advances in PEM Fuel Cell Research at Los Alamos National Laboratory," from the 1988 Fuel Cell Seminar, Programs and Abstracts. This method was as follows:
1. Two fuel cell electrodes were obtained from Prototech, Inc. now called E-TEK, Inc. (Framingham, Mass.). The two fuel cell electrodes were impregnated with 2 drops of 1% Nafion ® solution and air dried at 70° C.
2. The electrodes were bonded to a Nafion ® membrane by pressing at 1000 psi (70.3 kg/cm$^2$) for 1.5 minutes at 130° C.

EXAMPLE 7

The membrane electrode assemblies described in EXAMPLES 1–6 were tested in a test loop based upon the thermoelectrochemical system described in U.S. Pat. No. 4,738,904. The thermal regeneration loop for regenerating the electrolytes included two storage tanks, connected by tubing to the electrode cell via circulating pumps. A line connected the two sides of the cell to transport hydrogen from the cathode to the anode. Pressure gauges and thermocouples were attached to monitor the system.

Cell tests were conducted such that the base pump bubbled hydrogen through the base storage tank thus saturating the hydrogen with ammonia or amine and water vapor. This gas mixture was then circulated through the cell anode.

To begin a test, the electrochemical apparatus was evacuated by means of a rotary pump. Then the line to the pump was closed and the vacuum used to draw the acid and base solutions into their respective storage tanks. Next, hydrogen was introduced into the system, and the pumps were started. Polarization measurements (current versus voltage) were then conducted on the electrochemical cell. A silver-chloride reference electrode was used to separate the polarization contributions of the cathode and anode. Ohmic losses in the cell were monitored by current interruption. Performance stability was noted by comparing the polarization curves at the beginning of the test to curves taken after about 2 hours of operation.

In addition to the cell tests, the adhesion of the electrodes to the membrane was noted based on the yield of successfully bonded membrane-electrode assemblies. Adhesion was also noted on larger membrane-electrode assemblies (25 cm$^2$ and 230 cm$^2$), where adhesion problems were more visible. Also, the electrodes were visually examined after testing to determine if the electrodes continued to adhere to the membrane or if extensive peeling had occurred.

Table 1 shows comparative results of the cathodes when tested with lactic acid and ammonia as the electrolytes.

Table 2 shows the results of the adhesion test and electrode stability.

The results in Tables 1 and 2 show that the best performance, yield and stability was obtained when the membrane was plasma etched, the anode was impregnated with Nafion ® solution and the assembly was bonded at 200° C. Lower bonding temperatures or unetched membranes resulted in membrane-electrode assemblies which have poor initial adhesion that subsequently leads to premature delamination. This delamination results in the inactivation of the electrode assembly since the reaction products cannot cross the resulting gap between the membrane and electrode. Furthermore, the dynamics of the flowing electrolyte can sweep away the loose electrode material which could otherwise obstruct the flow channels.

While not limiting the present invention to a particular theory of operation, it is believed that the enhanced performance of the membrane-electrode assembly is achieved due to the combination of plasma etching and the higher bonding temperature. It is believed this combination creates physical or chemical surface modifications which allow a stronger bond between the membrane and the catalytic electrode layer.

It should be noted by those skilled in the art that the plasma etching and heat bonding conditions used in the above examples are representative only and that minor changes in the etching and bonding conditions will also produce suitable membrane-electrode assemblies which can be used in a wide variety of electrochemical systems. For example, the membrane-electrode assembly in accordance with the present invention is suitable for use in a chlor-alkali cell wherein chlorine evolves at

TABLE 1

Cell Tests Using Lactic Acid and Ammonia

| Ex. No.* | Open Circuit Voltage (mV) | Max. Power (mW/cm$^2$) | Cell Polarizations (ohm-cm$^2$) | | |
|---|---|---|---|---|---|
| | | | Memb. | Anode | Cathode |
| 1 | 267 | 18.2 | 0.57 | 0.45 | 0.03 |
| 3 | 250 | 12.0 | 0.60 | 0.27 | 0.44 |
| 4 | 220 | 7.2 | 0.55 | 0.03 | 1.27 |
| 5 | 226 | 6.1 | 0.85 | 0.85 | (Combined) |

*Example number describing specific memrane-electrode assembly tested.

TABLE 2

| Ex. No.* | Adhesion Tests | | |
|---|---|---|---|
| | Pressing Yield | Performance Stability | Post Mortem Appearance |
| 1 | 90% | Excellent | No Peeling |
| 2 | 70% | Moderate | Some Peeling |
| 3 | 70% | Poor | Much Peeling |
| 4 | 70% | Moderate | Some Peeling |
| 5 | 50% | Poor | Mostly Peeled |
| 6 | 90% | Moderate | Slight Peeling |

*Example number describing specific membrane-electrode assembly tested.

the anode and hydrogen evolves at the cathode. Accordingly, the present invention is not limited by the above disclosure but is only limited by the following claims.

What is claimed is:

1. A membrane-electrode assembly adapted for use in a thermoelectrochemical system, said assembly comprising:
   a radiation grafted cation exchange membrane having a plasma etched anode surface and a plasma etched cathode surface wherein said plasma comprises an oxidizing gas;
   a cathode which is bonded to said plasma etched cathode surface of said membrane; and
   an anode which is bonded to said plasma etched anode surface of said membrane.

2. A membrane-electrode assembly according to claim 1 wherein said radiation grafted cation exchange membrane is selected from the group of membranes consisting of radiation grafted fluorosulfonic acid membranes, radiation grafted benzenesulfonic acid membranes, radiation grafted acrylic acid membranes and radiation grafted methacrylic acid membranes.

3. A membrane-electrode assembly according to claim 2 wherein said membrane is a radiation grafted benzenesulfonic acid membrane.

4. A membrane-electrode assembly according to claim 1 wherein said cathode and said anode each comprises catalytic electrode particles selected from the group consisting of platinum, palladium, nickel boride, tungsten carbide, silver, platinized carbon black and platinized graphite.

5. A membrane-electrode assembly adapted for use in a thermoelectrochemical system, said assembly being made by the process comprising the steps of:
   providing a radiation grafted cation exchange membrane having an anode surface and a cathode surface;
   plasma etching said anode and cathode surfaces of said membrane with an oxidizing gas to provide an etched membrane having plasma etched anode and cathode surfaces;
   bonding an anode to said plasma etched anode surface; and
   bonding a cathode to said plasma etched cathode surface.

6. A membrane-electrode assembly made according to the process of claim 5 wherein said radiation grafted cation exchange membrane is selected from the group of membranes consisting of radiation grafted fluorosulfonic acid membranes, radiation grafted benzenesulfonic acid membranes, radiation grafted acrylic acid membranes and radiation grafted methacrylic acid membranes.

7. A membrane-electrode assembly made according to the process of claim 5 wherein said membrane is a radiation grafted benzenesulfonic acid membrane.

8. A membrane-electrode assembly made according to the process of claim 5 wherein said cathode and said anode each comprises catalytic electrode particles selected from the group consisting of platinum, palladium, nickel boride, tungsten carbide, silver, platinized carbon black and platinized graphite.

9. A membrane-electrode assembly made according to the process of claim 5 wherein said oxidizing gas is selected from the group consisting of oxygen, ozone, chlorine oxide and fluorine oxide.

10. A membrane-electrode assembly made according to the process of claim 9 wherein said plasma comprises oxygen.

11. A membrane-electrode assembly made according to the process of claim 5 wherein the distance between said radiation grafted cation exchange membrane anode surface and cathode surface defines the thickness of said membrane and wherein no more than 20 percent of said membrane thickness is etched away during said plasma etching of said anode and cathode surfaces.

12. A membrane-electrode assembly made according to the process of claim 5 wherein the bonding of said plasma etched anode and cathode surfaces to said anode and cathode, respectively, is accomplished by applying sufficient heat and pressure for a sufficient time to thermally bond said anode and cathode to said plasma etched anode and cathode surfaces.

13. A membrane-electrode assembly made according to the process of claim 12 wherein said anode and said cathode are thermally bonded to said membrane at a temperature of about 200° C.

14. A membrane-electrode assembly made according to the process of claim 5 wherein said cathode and/or said anode is treated with Nafion ® solution prior to bonding to said membrane.

* * * * *